(12) United States Patent  
Krantz-Lilienthal

(10) Patent No.: US 8,480,048 B2
(45) Date of Patent: Jul. 9, 2013

(54) FASCIA ATTACHMENT SYSTEM

(75) Inventor: Eric N. Krantz-Lilienthal, Janesville, WI (US)

(73) Assignee: Springs Window Fashions, LLC, Middleton, WI (US)

(*) Notice: Subject to any disclaimer, the term of this patent is extended or adjusted under 35 U.S.C. 154(b) by 345 days.

(21) Appl. No.: 12/835,089

(22) Filed: Jul. 13, 2010

(65) Prior Publication Data

US 2011/0006176 A1 Jan. 13, 2011

Related U.S. Application Data

(60) Provisional application No. 61/225,016, filed on Jul. 13, 2009.

(51) Int. Cl.
*A47H 1/14* (2006.01)
*F16B 1/00* (2006.01)

(52) U.S. Cl.
USPC ............... 248/267; 248/205.1; 248/231.81; 248/222.51; 160/23.1; 52/360; 52/715

(58) Field of Classification Search
USPC ............... 248/205.1, 222.11, 266–267, 251, 248/300, 229.16, 229.26, 231.81, 222.51, 248/228.7, 208; 160/23.1; 24/292–295, 581.11; 403/397; 52/285.3, 489.1, 712, 360, 715, 52/716.7
See application file for complete search history.

(56) References Cited

U.S. PATENT DOCUMENTS

| | | | | |
|---|---|---|---|---|
| 3,292,479 A * | 12/1966 | Tinnerman et al. | ........ | 24/581.1 |
| 3,695,568 A * | 10/1972 | Hogrebe | ........ | 248/222.51 |
| 4,943,022 A * | 7/1990 | Rinderer | ........ | 248/205.1 |
| 5,202,172 A * | 4/1993 | Graf | ........ | 428/100 |
| 5,325,651 A * | 7/1994 | Meyer et al. | ........ | 52/715 |
| 5,330,821 A * | 7/1994 | Lo | ........ | 428/120 |
| 5,526,553 A * | 6/1996 | Klein | ........ | 24/295 |
| 5,533,560 A * | 7/1996 | Morris | ........ | 160/178.1 R |
| 6,935,401 B2 * | 8/2005 | Fraczek et al. | ........ | 160/321 |
| 7,127,862 B2 * | 10/2006 | Saldana | ........ | 52/715 |
| 7,367,536 B1 * | 5/2008 | Anderson et al. | ........ | 248/251 |
| 2003/0201072 A1 * | 10/2003 | Bergeron et al. | ........ | 160/38 |
| 2006/0021718 A1 * | 2/2006 | Franssen | ........ | 160/178.1 R |
| 2008/0121768 A1 * | 5/2008 | Wen et al. | ........ | 248/200 |
| 2008/0202709 A1 * | 8/2008 | Anderson et al. | ........ | 160/321 |

* cited by examiner

*Primary Examiner* — Terrell McKinnon
*Assistant Examiner* — Ingrid M Weinhold
(74) *Attorney, Agent, or Firm* — Taylor IP, P.C.

(57) ABSTRACT

A fascia mounting system for a window covering includes a bracket having a front flange with a removable spring clip at the bottom of the front flange. A fascia member of the system includes structure engaging the upper end of the flange and the spring clip at the bottom of the flange.

12 Claims, 3 Drawing Sheets

FASCIA ATTACHMENT SYSTEM

CROSS-REFERENCE TO RELATED APPLICATIONS

The present application claims the benefits of U.S. Provisional Application Ser. No. 61/225,016 filed Jul. 13, 2009.

FIELD OF THE INVENTION

The present invention relates generally to window coverings and, more particularly, to decorative front panel structures, or fascia used to conceal operating and adjustment mechanisms for blinds, including solar blinds and other structures or arrangements of window treatments that are not pleasing aesthetically.

BACKGROUND OF THE INVENTION

Different types of treatments or coverings are provided for windows, doors and other architectural openings to serve both aesthetic and functional purposes. It is known to provide decorative coverings over generally unsightly window treatment working mechanism. For example, solar shades and other roller shades are provided with a roller or other implement on which the shade material is rolled when not in use. For motorized shades, and manually operated shades used to cover large windows, the operating mechanism of the shade and the material when rolled thereon can be quite large, visually prominent and decoratively displeasing. Accordingly, for aesthetic purposes, it is known to provide a covering fascia that attaches to brackets at the ends of the window treatment that attach the window treatments to a wall, ceiling or other structure. Since it may become necessary from time to time to access the working mechanism of the window treatment for adjustment and/or repair, it is preferable that the fascia can be removed without great difficulty, so that adjustments or repairs can be made.

Known systems by which decorative fascia are connected to brackets generally involve the use of fasteners or interference fits between the fascia and the bracket. However, known attachment systems are difficult and cumbersome to use. Attachment and detachment can be especially difficult when the shade is mounted close to the ceiling or in a corner of two walls where it is difficult to hold the fascia and/or to use tools that might be required to fasten the fascia. Further, to hold securely, the interference relationship must be accurate, with close tolerances to ensure that the fascia is not too loose so as to fall, or too tight so as to be difficult to attach and detach.

Accordingly, improvements in such attachment systems to facilitate attachment and detachment of fascia will be advantageous.

SUMMARY OF THE INVENTION

The present invention provides a spring clip to establish the requisite interference between the bracket and the fascia. The spring clip can yield to facilitate attachment or detachment of the fascia. The spring clip can be attached to either side of the bracket as necessary for the particular installation. The spring clip can work effectively over a wide range of dimensional variances, making the attachment secure, yet easily releasable.

In one aspect of a form thereof, a fascia attachment assembly for attaching a fascia member to a shade or blind is provided with a bracket including mounting holes for attaching the bracket to a structure and a front member of the bracket defining an upper end and a lower end. A removable spring clip is connected to the lower end of the front member. A fascia member has a front panel including a lip for engaging the upper end of the front member and a bottom panel including a channel for releasably engaging the spring clip.

In another aspect of a form thereof, a fascia attachment assembly is provided for attaching a fascia member to a blind. A bracket includes a plate supporting a shade end member and a vertical flange at a front edge of the plate, the vertical flange having an upper end and a lower end. A removable spring clip is connected to the lower end of the vertical flange. A fascia member is connected to the upper end of the vertical flange and to the removable spring clip.

In another aspect of a form thereof, a spring clip for attaching a fascia member to a mounting bracket of a window blind is provided with a base and first and second anchors extending from the base and configured for receiving a vertical flange of the bracket there between. A spring support is disposed in spaced relation to the base, and a transition connects the base to the spring support. A curved foot extends from a distal end of the spring support.

The fascia attachment system and spring clip enable a fascia to be attached quickly, to be connected securely and to be removed when needed.

The fascia attachment system and spring clip facilitate attachment of a fascia in difficult to install situations, without the need for tools.

Other features and advantages of the invention will become apparent to those skilled in the art upon review of the following detailed description, claims and drawings in which like numerals are used to designate like features.

Figure 1:
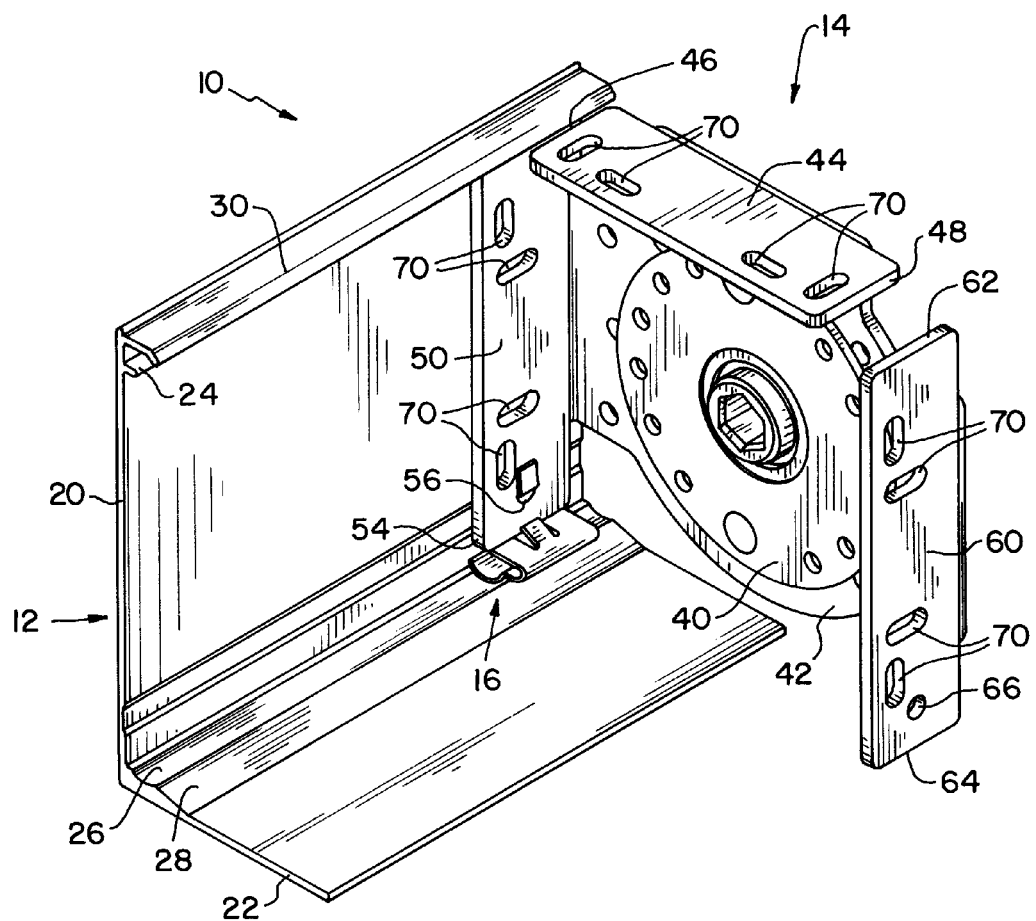
FIG. 1 is a fragmentary perspective view of a fascia attachment system.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, FIG. 1 illustrates a fascia attachment assembly or system 10 whereby a fascia member 12 is connected to a solar shade mounting bracket 14 with the use of a fascia mounting spring clip 16. It should be understood that fascia member 12 will be connected between two brackets 14, one near each end thereof. However, for illustration purposes a single bracket 14 is shown in the drawings. Further, the specific size, shape and style of the fascia member and the type of shade held by the bracket as described herein are merely exemplary. Attachment assembly 10 is shown in a commonly encountered installation arrangement whereby fascia member 12 is installed in front of and beneath mounting bracket 14, with bracket 14 being attached on the surface of a wall there behind or a ceiling there above; and terms such as "upper", "lower", "front", "back", "behind" and the like are used herein for clarity in description with respect to the exemplary installation shown.

Fascia member 12 can be an extruded member of suitable length made of metal, plastic or the like. Fascia member 12 includes a front panel 20 and a bottom panel 22 substantially at right angle orientation with respect to one another. An inwardly extending lip 24 is provided near the upper edge of front panel 20 to facilitate engagement with bracket 14. At the transition from front panel 20 to bottom panel 22 the panels are thickened, and bottom panel 22 defines a curved bottom channel 26 near front panel 20 and a ramp 28 angling downwardly from the edge of the thickened portion defining channel 26 to the main body portion of bottom panel 22. A return 30 is provided above inwardly extending lip 24 for direct engagement with bracket 14 and for improved decorative concealment. Fascia member 12 thereby conceals the front and bottom of a shade on which it is installed, with the shade material being accumulated behind front panel 20 and above bottom panel 22 and extendable and retractable past the inner edge of bottom panel 22.

Bracket 14 in the exemplary embodiment is shown holding a roller shade end member 40, which may be of other shapes and configurations than as shown. Bracket 14 includes a plate 42 holding end member 40, and a horizontal flange 44 at the top of plate 42 in the orientation illustrated in the drawings. Horizontal flange 44 extends a substantial distance along one edge of plate 42 and includes horizontal flange ends 46, 48. Bracket 14 further includes first and second vertical flanges 50, 60 extending along edges of plate 42 adjacent to horizontal flange 44. Accordingly, first and second vertical flanges 50, 60 are disposed along opposite edges of plate 42. Vertical flanges 50, 60 extend along substantial distances of opposite edges of plate 42 and include proximal ends 52, 62, respectively, with respect to horizontal flange 44 and distal ends 54, 64, respectively, with respect to horizontal flange 44. Vertical flanges 50, 60 each define and include a spring clip receiving hole 56, 66 near to distal ends 54, 64, respectively, for the selective attachment of spring clip 16 thereto as will be described hereinafter. Spring clip receiving holes 56, 66 are provided in vertical flanges 50, 60 near the distal ends thereof defining the open bottom edge of bracket 14, opposite to horizontal flange 44.

The horizontal and vertical flanges each include pluralities of mounting holes 70, by which bracket 14 can be attached to a wall, ceiling or other support structure using a suitable fastener, such as a screw.

Figure 2:
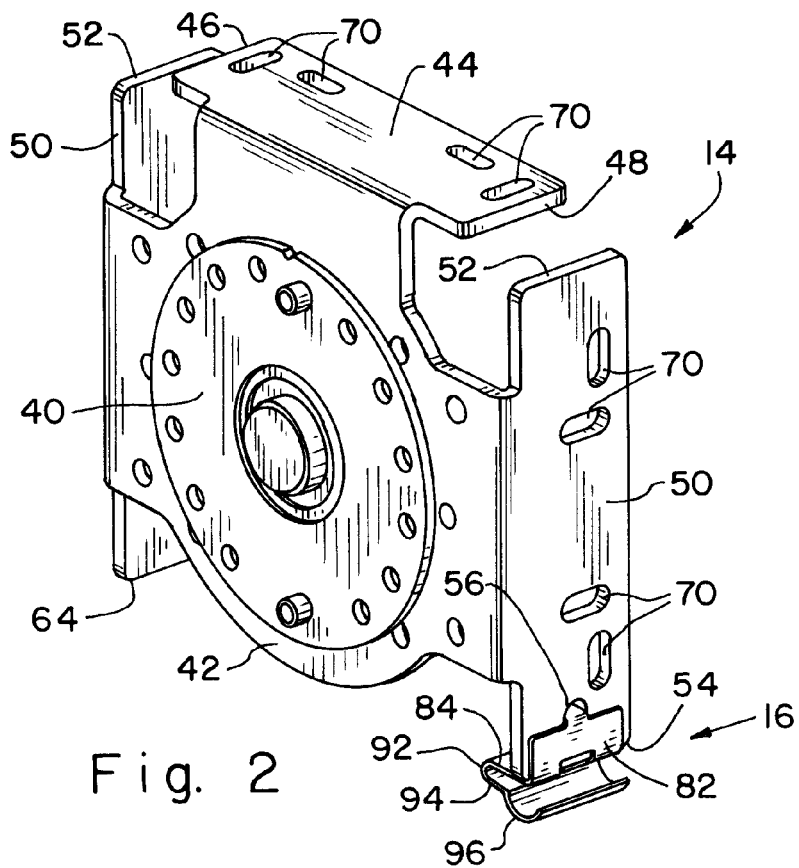
FIG. 2 is a is a perspective view of the spring clip of the system mounted on the bracket of the system, without a fascia member attached thereto.
Figure 3:
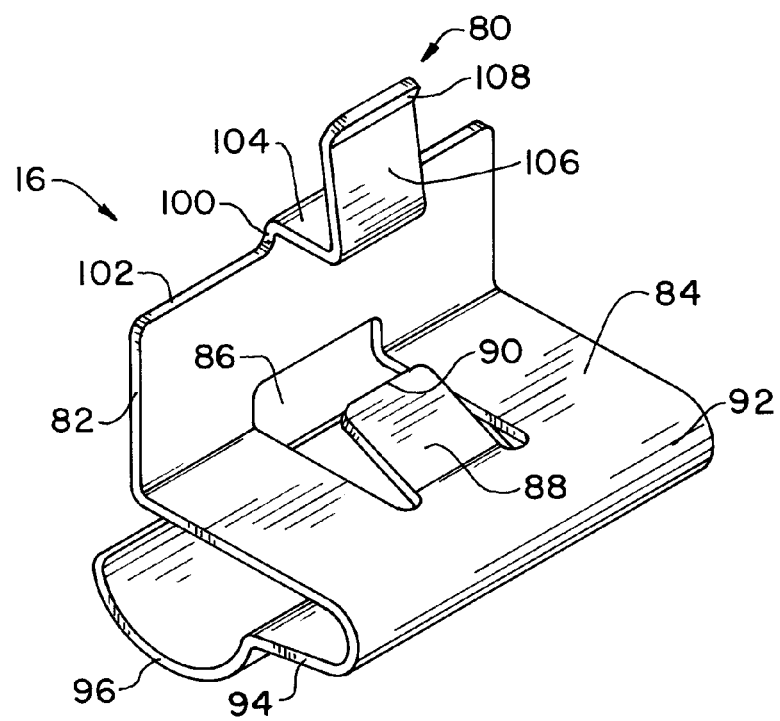
FIG. 3 is a perspective view of the spring clip alone.

FIG. 2 illustrates spring clip 16 attached to bracket 14, and FIG. 3 illustrates spring clip 16 alone. Spring clip 16 includes a shaped finger 80 extending both laterally and upwardly from the upper edge of an outside anchor 82. A base 84 extends inwardly from the bottom of outside anchor 82 and defines an open window 86 therein. Window 86 can include a portion of the common edge between outside anchor 82 and base 84, and therefore extend somewhat into outside anchor 82 as well as base 84. An inside anchor 88 is formed as a tab of narrower width than the width of opening of window 84. Outside anchor 82 and base 84 are substantially flat panels. Inside anchor 88 angles outwardly from the inside edge perimeter of window 86, with a distal end 90 of anchor 88 in spaced relation to outside anchor 82. Spring clip 16 further includes a curved, U-shaped transition 92 from base 84 to a spring support 94 and a curved foot 96 from the distal end of spring support 94. Curved foot 96 curves downwardly in the orientation shown in the drawings.

Shaped finger 80 includes a transitioning pedestal 100 from upper edge 102 of outside anchor 82, a generally horizontal proximal segment 104 extending rearward from pedestal 100, and a generally vertically disposed and forwardly angled distal segment 106 with a rearward angled tip 108.

Spring clip 16 can be installed before bracket 14 is attached via a fastener or fasteners in some of the mounting holes 70, or spring clip 16 can be attached to bracket 14 after the bracket has been installed. Spring clip 16 can be installed on either vertical flange 50 or vertical flange 60. One of vertical flanges 50, 60 defines the outer edge of bracket 14 in its installed condition, and spring clip 16 is attached thereto.

Spring clip 16 is attached to bracket 14 by inserting finger 80 through either spring clip receiving hole 56 of vertical flange 50 or spring clip receiving hole 66 of vertical flange 60, depending on the installation orientation of bracket 14. With finger 80 inserted through the appropriate spring clip receiving hole 56 or 66, the spring clip is manipulated to further engage the lower and of flange 50 or 60, with outside anchor 82 disposed along and against the outer surface of the flange and inside anchor 88 disposed along and against the inner surface of the flange.

In the exemplary illustrations, spring clip 16 is attached to vertical flange 50. Finger 80 is inserted from the outside surface of the vertical flange so that horizontal proximal segment 104 of finger 80 extends through hole 56 and vertical distal segment 106 angles from the inner end of horizontal proximal segment 104 toward and against the inner surface of vertical flange 50 above hole 56. It should be understood that spring clip 16 is inserted by positioning distal segment 106 of finger 80 angular toward hole 56, inserting distal segment 106 fully through hole 56 and then twisting or reorienting spring clip 16 so that outside anchor 82 is substantially parallel to and against the outer surface of vertical flange 50. When spring clip 16 is reoriented in this manner, proximal segment 104 extends through hole 56 and distal segment 106 angles therefrom toward and against the inner surface of vertical flange 50. During attachment, U-shaped transition 92 passes beneath distal end 54 inwardly until base 84 is positioned along and against distal end 54. During such movement, inside anchor 88 passes just inwardly of vertical flange 50, being deflected downwardly in window 86 until distal end 90 of inside anchor 88 clears vertical flange 50 so that anchor 88 can rebound outwardly against the inner surface of the vertical flange 50. Spring clip 16 is firmly attached to vertical flange 50, with finger 80 extending through hole 56 and with outside anchor 82 against the outer surface of vertical flange 50 and inside anchor 90 as well as tip distal segment 106 of finger 80 engaging the inner surface of vertical flange 50. Spring clip 16 is inhibited from sideways movement and from upward or downward movement also due to the engagement of finger 80 within hole 56, and the engagement of base 84 against the bottom edge of vertical flange 50.

Referring again to the exemplary embodiment shown in FIG. 1, fascia member 12 is connected to bracket 14 by tilting the fascia member and placing the upper edge, proximal end 52, of vertical flange 50 in the general area between lip 24 and return 30. Return 30 can be configured so as to overlap the upper edge of the vertical flange 50 or otherwise engage the vertical flange without slipping. With fascia member 12 engaged with proximal end 52, and tilted outwardly at the bottom, lip 24 and return 30 engage the upper edge of vertical flange 50 in a generally front and back relationship. The bottom edge of fascia member 12 is pushed toward bracket 14. Curved foot 96 is encountered by ramp 28 and is deflect upwardly due to the cantilevered connection of spring support 94 to transition 92. As the bottom of foot 96 clears the upper edge of channel 26, the curved foot slides into the curved channel, and fascia member 12 is thereby secured to bracket 14, with return 30 engaging the bracket directly at proximal end 52 of vertical flange 50, and channel 26 engaging spring clip 16 which is firmly secured to the bracket. Lip 24 confronts the front, outer face of vertical flange 50 in the final position, and provides an offset or spacer function facilitating install by enlarging the available hook area of return 30 when fascia member 12 is tilted outwardly at the bottom. Accordingly, less precision is required for installing the brackets squarely and in positioning the fascia for engagement while retaining a tight fit in the final installation due to the difference in projections of lip 24 and return 30.

Fascia member 12 can be detached by simply pulling outwardly on the bottom edge of the fascia member so that curved foot 96 and support 94 again flex upwardly until the curved foot clears the channel and slides down ramp 28. Continued outward and upward movement of the bottom of fascia member 12 allows return 30 to be disengaged from the upper end of vertical flange 50 so that the fascia member can be completely removed from the bracket.

Figure 4:
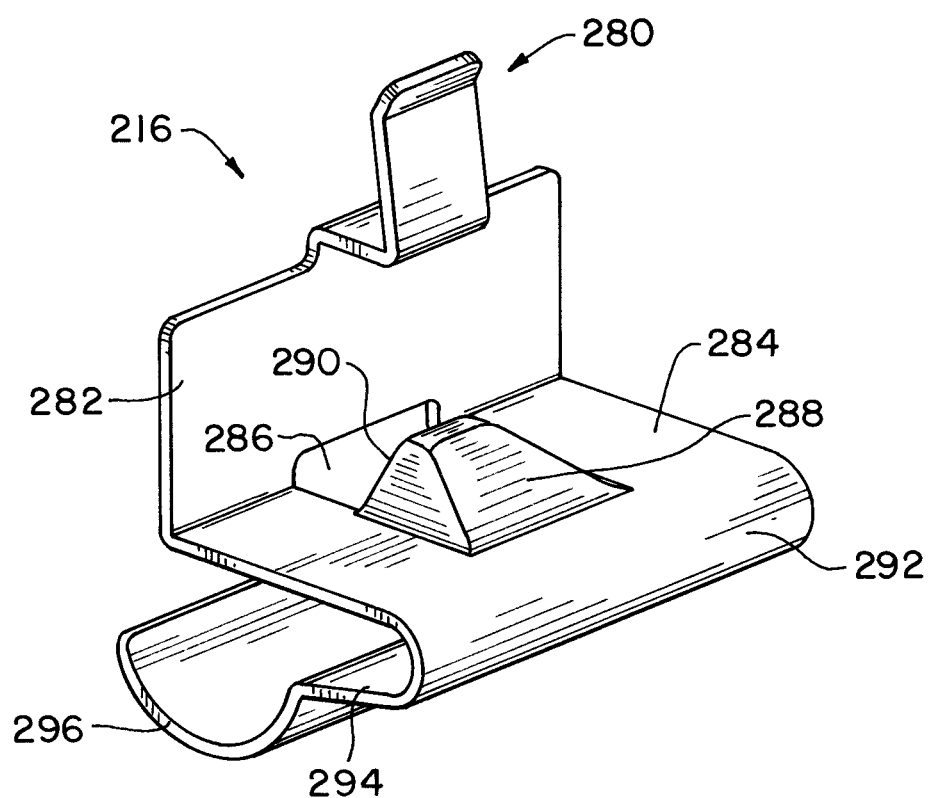
FIG. 4 is a perspective view of a second embodiment of the spring clip.

It should be understood that if vertical flange 60 defines the outer edge of bracket 14 as installed, spring clip 16 is connected thereto in a manner similar to that described above, by inserting finger 80 through spring clip receiving hole 66. Fascia member 12 can be connected by engaging lip 24 with the upper edge of vertical flange 60 and engaging channel 26 with spring clip 16 then connected at the lower edge of vertical flange 60. Attachment and removal is achieved by manipulating the fascia in a manner similar to that described above with respect to the exemplary orientation shown;

FIG. 4 is a perspective view of a second embodiment for the spring clip. A spring clip 216 of the second embodiment is similar to spring clip 16, including a finger 280 that is similar in structure and function to finger 80 described previously herein. Spring clip 216 further includes an outside anchor 282 a base 284, a U-shaped transition 292, a spring support 294 and a curved foot 296 that are similar in both structure and function to outside anchor 82, base 84, U-shaped transition 92, spring support 94 and curved foot 96 described previously. Spring clip 216 includes an open window 286 in base 284. An inside anchor 288 is formed as a domed, continuous projection from base 284, and defines a dome edge 288 facing but spaced from outside anchor 282. Attachment of spring clip 216 to a bracket, such as bracket 14, is achieved in a manner similar to that described above with respect to the attachment of spring clip 16. A lower edge portion of the bracket flange is held between outside anchor 282 and inside anchor 288, with finger 280 extending into a hole in the bracket flange.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fascia attachment assembly for attaching a fascia member to a shade or blind, said fascia attachment assembly comprising:
   a bracket including mounting holes for attaching the bracket to a structure;
   a front member of the bracket defining an upper end, a lower end and a hole near said lower end;
   a removable spring clip connected to said lower end of said front member, said spring clip including an outside anchor and an inside anchor disposed against outside and inside surfaces of said front member, said spring clip including a base disposed beneath said lower end of said front member; said outside anchor extending upwardly from said base; and a finger extending into said hole from said outside anchor; and
   a fascia member having a front panel including a lip for engaging said upper end of said front member and a bottom panel including a channel for releasably engaging said spring clip.

2. The fascia attachment assembly of claim 1, said bracket including a plate; said front member being a first vertical flange along one edge of said plate; and said bracket including a second vertical flange disposed along a second edge of said plate opposite from said first vertical flange.

3. The fascia attachment assembly of claim 1, said finger including a distal segment disposed against said inside surface of said front member.

4. The fascia attachment assembly of claim 1, said inside anchor extending angularly from said base toward and against said inside surface of said front member.

5. The fascia attachment assembly of claim 4, said spring clip including a U-shaped transition from said base, a spring support connected to said U-shaped transition and extending beneath said base in spaced relation thereto, and a curved foot at an outer end of said spring support.

6. A fascia attachment assembly, comprising;
   a bracket including a plate supporting a shade end member;
   a vertical flange at a front edge of said plate, said vertical flange having an upper end and a lower end;
   a removable spring clip connected to said lower end of said vertical flange, said spring clip including a base disposed beneath said lower end of said vertical member, a spring foot connected to said base, and anchors extending from said base along and against opposite surfaces of said vertical flange; and
   a fascia member connected to said upper end of said vertical flange and to said removable spring clip.

7. The fascia attachment assembly of claim 6, said spring clip including a finger extending from one of said anchors through a hole in said vertical flange.

8. The fascia attachment assembly of claim 7, said finger having a distal segment disposed against an inside surface of said vertical flange above said hole.

9. The fascia attachment assembly of claim 6, said bracket including first and second vertical flanges on opposite sides thereof, each said vertical flange having an upper end and a lower end; and said removable spring clip being selectively connectable to said lower end of said first and second vertical flanges.

10. The fascia attachment assembly of claim 6, said fascia member including a lip engaging said upper end of said vertical flange.

11. The fascia attachment assembly of claim 6, said fascia member including a channel engaging said spring clip.

12. The fascia attachment assembly of claim 6, said fascia member including a lip at an upper edge thereof engaging said upper end of said vertical flange and a channel defined at a lower end thereof engaging said spring clip.

* * * * *